United States Patent Office 3,784,505
Patented Jan. 8, 1974

3,784,505
COATING COMPOSITION CONTAINING SILANE, DIKETONE, AND FILLER
Robert Wendell Lerner, Hossein Hayati, and John Robert Flasch, Adrian, Mich., assignors to Stauffer Chemical Company, New York, N.Y.
No Drawing. Filed Dec. 30, 1971, Ser. No. 214,426
Int. Cl. C08g 51/04
U.S. Cl. 260—37 SB                                14 Claims

ABSTRACT OF THE DISCLOSURE

A coating composition containing a hydrolyzed and condensed organotrihydrocarbonoxy silane, a diketone, and a particulate solid. The coating composition will impart galvanic protection to metal surfaces coated therewith.

---

The present invention relates to a coating composition, particularly a coating composition containing particulate solids and more particularly to a zinc filled coating composition which, when applied to a metal surface, will impart galvanic protection thereto.

Many of the coating compositions used heretofore have short shelf stability and when applied to a surface provide a soft, powdery coating when cured. Furthermore, it was difficult to obtain a uniform coating when particulate solids, such as zinc were incorporated therein. Likewise, many of the coating compositions, when applied to metal substrates often cracked upon drying, thereby exposing the substrates to the environment.

Therefore, it is an object of this invention to provide a protective coating for metal surfaces. Another object of this invention is to provide an appropriate binder for incorporating particulate solids therein. Another object of this invention is to provide an appropriate binder for incorporating zinc therein. Another object of this invention is to provide a binder composition having relatively long shelf life and which may be readily applied to a surface in the manner of a paint. Still another object of this invention is to provide a coating which will cure on a metal substrate to form a hard abrasion resistant, tightly adherent film. A further object of this invention is to provide a coating composition which exhibits improved solvent resistance, improved pot-life and improved adhesion when applied to metal substrates. A still further object of this invention is to provide a coating composition which exhibits improved adhesion between said coating and a subsequently applied organic topcoat.

The foregoing objects and others which will become apparent from the following description are accomplished in accordance with this invention, generally speaking, by providing a binder composition containing a hydrolyzed organotrihydrocarbonoxy silane and a diketone which can be combined with particulate solids to form a paint-like coating composition having a satisfactory shelf life.

The organotrihydrocarbonoxy silanes used in the preparation of the binder composition may be represented by the formulae:

$$RSi(OR')_3 \text{ and } RSi(OR''OR''')_3$$

in which R and R' are aliphatic and aromatic hydrocarbon radicals having up to about 10 carbon atoms and more preferably from about 1 to 6 carbon atoms, R" is a divalent hydrocarbon radical having from 2 to 6 carbon atoms, and R''' is the same as R' or hydrogen. Examples of suitable monovalent hydrocarbon radicals represented by R, R', and R''' are alkyl radicals such as, methyl, ethyl, butyl, hexyl, octyl and decyl; and aryl radicals such as, phenyl, tolyl and xylyl. Also, R can be any alkenyl radical, such as vinyl, allyl, hexenyl and butadienyl. Divalent hydrocarbon radicals represented by R" above are ethylene, trimethylene, tetramethylene, hexamethylene, phenylene and the like.

Suitable organotrihydrocarbonoxy silanes are methyltrimethoxysilane, methyltriethoxysilane, methyltripropoxysilane, methyltributoxysilane, methyltrioctoxysilane, ethyltriethoxysilane, propyltrimethoxysilane, propyltributoxysilane, propyltrioctoxysilane, propyltridecoxysilane, butyltrimethoxysilane, butyltriethoxysilane, butyltributoxysilane, butyltrioctoxysilane, butyltridecoxysilane, butyltriphenoxysilane, hexyltrimethoxysilane, hexyltriethoxysilane, hexyltributoxysilane, hexyltrioctoxysilane, hexyltriphenoxysilane, phenyltrimethoxysilane, phenyltriethoxysilane, phenyltributoxysilane, phenyltrioctoxysilane, allyltrimethoxysilane, allyltriethoxysilane, vinyltrimethoxysilane, vinyltriethoxysilane, vinyltributoxysilane, butadienyltrimethoxysilane, methyl tri - (2 - methoxy-ethoxy) silane, ethyl tri-(4-ethoxy-butoxy) silane, ethyl tri-(2-butoxy-ethoxy) silane, butyl tri-(2-ethoxy-ethoxy) silane, hexyl tri-(2-methoxy-ethoxy) silane, phenyl tri-(ethoxy-ethoxy) silane, methyl tri-(propylene glycol) silane, butyl tri-(ethylene glycol) silane, phenyl tri-(ethylene glycol) silane, and mixtures thereof.

These organotrihydrocarbonoxy silanes may be prepared by various methods described in the literature. For example, the hydrocarbonoxy silanes may be prepared by a Grignard-type synthesis using the corresponding hydrocarbon chloride and an alkylorthosilicate.

The general reaction is:

$$RX + Si(OR')_4 + Mg \rightarrow RSi(OR')_3 + MgXOR'$$

where R and R' are the same as represented above and X is a halogen. Generally, heating in the range of from about 50° C. to about 130° C. is necessary. It may be necessary to add a small amount of a reagent such as methyl magnesium chloride to initiate the reaction.

Alternatively, methyltrichlorosilane may be reacted with ethanol in the presence of ammonia to form methyltriethoxysilane and ammonium chloride. Phenyltrihydrocarbonoxy silane may likewise be obtained in an analogous manner by using phenylchlorosilanes.

The organotrihydrocarbonoxy silanes may also be prepared by reacting finely divided silicon in the presence of an alcohol or phenol in a neutral or acid phase at a temperature of from 20 to 360° C., separating the silane formed from the reaction mixture and thereafter reacting the thus formed silane with an unsaturated hydrocarbon in the presence of a conventional catalyst.

The hydrocarbonoxy silanes of the formula $$RSi(OR''OR''')_3$$

are prepared by reacting a methyl trichlorosilane with the corresponding monoethers of alkylene glycols or mixtures thereof to produce HCl and the silane. The alkylene glycol-ethers are produced by the normal reactions of the corresponding alcohols (R'''OH) with an alkylene glycol in a 1:1 addition.

The binder compositions of this invention are prepared by mixing the organotrihydrocarbonoxy silane with sufficient water to provide at least 0.8 mole of water per hydrocarbonoxy group and more preferably from about 1.0 to 4.5 moles of water per hydrocarbonoxy group present on the silicon atom. It has been found that where the amount of water is below about 0.8 mole per hydrocarbonoxy group the coating composition produced therefrom does not have the desired hardness, nor does it exhibit satisfactory resistance to abrasion.

These organotrihydrocarbonoxy silanes are hydrolyzed and condensed to the extent that the $SiO_2$ content ranges from about 5 to 40 percent on a weight basis. Particularly good results have been obtained with a condensate containing from about 15 to 30 percent $SiO_2$.

Diketones having the following general formula

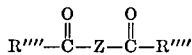

wherein Z represents divalent radicals having from 1 to 4 carbon atoms and R'''', which may be the same or different, represents monovalent hydrocarbon, halohydrocarbon and oxyhydrocarbon radicals containing from 1 to 12 carbon atoms, may be incorporated in the compositions of this invention.

Examples of suitable divalent hydrocarbon radicals are alkylenes such as methylene, ethylene, propylene, butylene and alkenylenes such as ethylene, propenylene and isopropenylene.

Examples of suitable hydrocarbon radicals represented by R'''' above, are aliphatic, including cycloaliphatic, arcmatic-substituted aliphatic, aromatic and aliphatic-substituted aromatic hydrocarbon radicals. Suitable radicals are alkyl, e.g., methyl, ethyl and propyl through dodecyl, cyclopentyl, cyclohexyl, cycloheptyl, etc.; alkenyl; e.g., vinyl, ethenyl, propenyl and other alkenyl radicals corresponding to the aforementioned alkyl radicals; aralkyl; e.g., benzyl, phenylethyl, phenylpropyl, etc.; aryl; e.g., phenyl, biphenyl, naphthyl, etc.; alkaryl; e.g., tolyl, xylyl, diethylphenyl, dipropylphenyl, butylphenyl, etc.; the corresponding chlorinated, brominated and fluorinated derivatives (mono- through perhalogenated in the linear chain and/or in the aromatic nucleus); and the corresponding oxy derivatives wherein one or more oxygen atoms are positioned between carbon atoms in a linear chain and/or an aromatic ring. For instance R'''' in the above formula may be alkoxyalkyl; e.g., methoxymethyl, -ethyl, -propyl, -butyl, -pentyl and -hexyl.

Examples of suitable diketones are acetylacetone (2,4-pentanedione), benzoylacetone (1-phenyl-1,3-butanedione), dibenzoylmethane (1,3 - diphenylpropanedione), 2-furoylacetone, trifluoroacetylacetone, propionylacetone, butyrylacetone, 3-methyl-2,4-pentanedione and 3-ethyl-2,4-pentanedione.

In addition, β-ketoesters such as ethylacetoacetate, methylacetoacetate and propylacetoacetate may be used in this invention.

Any suitable technique may be used to incorporate the diketones into the binder composition. In some instances, it may be adventageous to admix the diketone with the silane prior to hydrolysis and condensation or the diketone may be added at any time after hydrolysis and simultaneous condensation have been initiated up to the time or point that the particulate solids are admixed with the binder composition. Generally, it is preferred that the diketone be added just prior to or during the hydrolysis and simultaneous condensation of the hydrocarbonoxy silane.

A sufficient amount of diketone should be incorporated in the binder composition to improve the physical properties, such as hardness, solvent resistance and adhesion of the coating composition. Although the amount may vary considerably, the amount of diketone in the coating composition generally ranges from about 0.5 to about 10 percent and more preferably from about 1 to 7 percent by weight based on the weight of the hydrocarbonoxy silane. Good results in improving properties such as hardness, solvent resistance and adhesion have been obtained when the diketone was present in the coating composition in an amount of from 1 to 5 percent by weight. In addition it was found that the adhesion between the subject coatings and subsequently applied organic coatings, such as vinyl and epoxy topcoats, is significantly improved by incorporating a diketone in the coating composition of this invention.

Although it is not essential, it is preferred, that a solvent be employed in the preparation of the binder compositions. Suitable solvents include the higher boiling ethers, such as, monoalkylene glycol monoalkyl ethers, dialkylene glycol monoalkyl ethers, dialkylene glycol dialkyl ethers, monoalkylene glycol dialkyl ethers, ketones, such as, acetone; alcohols, such as, ethanol, isopropanol, butanol, hexanol, diacetone alcohol; glycols, such as, polyethylene glycols; hydrocarbon solvents, such as, hexane, heptane, benzene, toluene, xylene; chlorinated hydrocarbon solvents; water and mixtures thereof. The drying time, viscosity and so forth, may be adjusted by proper choice of solvents or mixtures thereof. The solvent to hydrocarbonoxy silane ratio is subject to wide variation depending on the characteristics desired in the finished binder. Thus, the ratio may lie anywhere within the limits of from about 0.5:1 to 10:1.

Although the amount of acid necessary for the hydrolysis of the organotrihydrocarbonoxy silane is not critical, it is preferred that sufficient acid be present to provide a pH of from about 1.0 to about 5.5 and more preferably from about 1.4 to 4.5. Generally the amount of acid, particularly hydrochloric acid may range from about 0.001 to about 0.08 and more preferably from about 0.005 to about 0.05 percent by weight. Other inorganic acids such as sulphuric and hydrofluoric acid may be used either alone or in conjunction with hydrochloric acid.

Also, monobasic and dibasic organic acids free of hydroxyl groups and having the requisite strength may be used as well as metal chlorides, nitrates and sulfates, where the metal is a member of Group III or IV of the Periodic Table. Examples of suitable organic acids are acetic acid, butyric acid, caproic acid, capric acid, palmitic acid, oleic acid, oxalic acid, fumaric acid, crotonic acid, acrylic acid, maleic acid, malonic acid, succinic acid, glutaric acid, adipic acid, suberic acid, sebacic acid and halogenated carboxylic acids. Other organic acids which may be used are benzoic acid, toluene sulfonic acid and alkyl phosphoric acids in which the alkyl groups contain from 1 to 4 carbon atoms.

Generally the amount of organic acid will range from about 0.1 to about 1.0 percent and more preferably from about 0.3 to about 0.8 percent by weight based on the weight of the binder composition.

The binder compositions of this invention may be prepared by mixing the silane with an organic solvent and a diketone and thereafter sufficient water is added, preferably acidized water, to provide at least 0.8 mole per hydrocarbonoxy group present on the silicon atom. The solution is stirred and within a short period of time it will be evident that a definite exothermic reaction has occurred. As a result, the solution becomes quite warm, yielding a homogeneous, clear liquid product. The diketones may be incorporated in the binder composition resulting from the hydrolysis of the hydrocarbonoxy silanes. The exact nature of the chemical reaction taking place between the organotrihydrocarbonoxy silane and water is not known with certainty and the present invention is not intended to be limited to any particular mode of reaction. It may, however, be postulated that what takes place in hydrolysis followed by intermolecular condensation polymerization which results in the eliminaiton of molecules of water and/or alcohol between the silicon containing moieties. It is known, for example, that the reaction between water and the organotrihydrocarbonoxy silane produces alcohols and silanol groups. The silanol groups condense with each other and with the hydrocarbonoxy groups to form Si—O—Si linkages, water and alcohol.

The coating compositions of this invention, are prepared by mixing finely-divided particulate solids, preferably zinc dust with the binder composition prepared above. Frequently, it is desirable to employ in lieu of pure zinc dust, a mixture of zinc dust and a suitable filler, such as, calcium and magnesium meta-silicate or minerals containing the same. Other fillers, particularly fibrous mineral fillers, such as, asbestos, fibrous talc, fibrous calcium meta-silicate, gypsum and the like may also be incorporated with zinc dust in these coating compositions. Other additives which may be included in the coating compositions are coloring pigments, such as, iron oxide, cadmium sulfide, titanium dioxide and most of the lithopones.

The zinc-binder ratio is largely a matter of customer preference or of the specifications to be met. Generally, the binder to zinc ratio lies within the range of 50:50 to 10:90 on a weight basis. However, where a filler is included in the composition, such as, the previously-mentioned calcium and magnesium meta-silicates, then the binder to total particulate ratio (zinc and filler) may go from 10:90 to as high as 70:30 on a weight basis.

Generally, these coatings can be cured at ambient temperature in about 24 hours; however, if desired, the coatings may be heat cured in an oven at temperatures ranging from about 100° F. to as high as 1000° F. At these elevated temperatures, the cure time will be substantially reduced.

The compositions conforming to the present invention have a flash point from about 80° F. to about 150° F. (Tag Open-Cup Method) and a pot life meeting the requirements of substantially any field of use.

These coating compositions may be applied to a cleaned metal substrate by painting, spraying or other conventional techniques known in the art. They display excellent adhesion on application and in may cases, the coating may be applied successfully to clean, steel surfaces without prior sand-blasting which is not possible with prior coatings. Good adherence to damp or even wet steel galvanized surfaces has been achieved. The coating will not freeze, nor, is it in any way adversely affected by bright sunlight at tropical temperatures. The coating shows excellent resistance to salt spray, fuels and to organic solvents. It is easily pigmented, hence it can be employed without an overcoat.

Surprisingly, it was found that the addition of a diketone to the binder composition provided a coating having improved hardness, improved solvent resistance and improved topcoat adhesion when compared with similar compositions prepared in the absence of diketones.

The invention is further illustrated by the following examples which are to be taken as in no way limitative thereof. All parts are by weight unless otherwise specified.

EXAMPLE 1

A binder composition is prepared by slowly adding with agitation 122 parts of deionized water to a reactor containing 400 parts of methyltriethoxysilane, 211 parts of ethylene glycol monoethyl ether and 2.4 parts of acetic acid, and thereafter continuing to agitate the reaction mixture for about 2 hours at a temperature up to about 60° C.

The binder composition thus prepared above is mixed with zinc dust (2 to 7 microns) in a ratio of 30 parts binder to 70 parts zinc dust and thereafter applied to a lightly sand-blasted steel substrate. After drying for about 24 hours at room temperature, the coating is tested for hardness in accordance with the standard hardness test. In this test, a pencil lead is employed having varying degrees of hardness corresponding to the scale 1B, 2B, 3B, F, H, 2H, 3H, 4H, 5H, etc. These values represent a progressive increase in hardness. The pencil lead is held at a 45° angle relative to the zinc coating as laid down on the steel panel and moderate force is applied until the coating is removed.

The solvent resistance of the coating is determined by immersing the coated substrate in methyl ethyl ketone and ethylene glycol monoethyl ether for 24 hours and thereafter evaluated for its cohesive and adhesive properties. The results are illustrated in the table.

EXAMPLES 2 TO 7

Binder compositions are prepared in accordance with Example 1 by incorporating varying amounts of different diketones in a solution containing methyltriethoxysilane, ethylene glycol monoethyl ether and an acid.

The binder compositions thus prepared are then mixed with zinc dust (2 to 7 microns) in a ratio of 30 parts binder to 70 parts zinc dust and thereafter applied to a lightly sand-blasted steel substrate, dried for 24 hours and then tested for hardness and solvent resistance in accordance with Example 1. The results of these tests are shown in the table.

TABLE I

| Example No. | $CH_3Si(OC_2H_5)_3$ (parts) | Solvent EG (parts) | Catalyst Acid | Catalyst Parts | Water (parts) | Diketone Compound | Diketone Parts | Solvent resistance MEK | Solvent resistance EG | Topcoat adhesions Vinyl coating | Topcoat adhesions Epoxy coating | Hardness (24 hours) |
|---|---|---|---|---|---|---|---|---|---|---|---|---|
| 1 | 400 | 211 | AC | 2.4 | 122 | | | G. | G. | F. | F. | 2H |
| 2 | 400 | 211 | AC | 2.4 | 122 | AcAc | 4 | V.G. | V.G. | G. | V.G. | 4H |
| 3 | 400 | 211 | AC | 2.4 | 122 | AcAc | 20 | V.G. | V.G. | V.G. | V.G. | 4H |
| 4 | 400 | 211 | AC | 2.4 | 122 | AcAc | 40 | V.G. | V.G. | V.G. | V.G. | 3H |
| 5 | 400 | 211 | HCl* | 0.9 | 122 | AcAc | 20 | V.G. | V.G. | V.G. | V.G. | 2H |
| 6 | 400 | 211 | HCl* | 0.9 | 122 | BA | 20 | V.G. | V.G. | V.G. | V.G. | 2H |
| 7 | 400 | 211 | AC | 2.4 | 122 | BeA | 20 | V.G. | V.G. | V.G. | V.G. | 3H |

*37%.

NOTE.—EG=Ethylene glycol monoethyl ether; AC=Acetic acid; AcAc=Acetylacetone; BeA=Benzoylacetone; BA=Butyrylacetone; MEK= Methyl ethyl ketone; F.=Fair; G.=Good; V.G.=Very good.

EXAMPLE 8

A binder composition is prepared by slowly adding with agitation about 115 parts of deionized water containing about 0.02 part of 37 percent hydrochloric acid to a reactor containing 250 parts of methyltriethoxysilane. The reaction mass is agitated for about 2 hours at a temperature of about 45° C. and then about 93 parts of ethylene glycol monomethyl ether and about 12.5 parts of acetylacetone are added to the reaction mass.

The resulting composition is then mixed with zinc dust (2 to 7 microns) in a ratio of 60 parts binder to 40 parts zinc dust and thereafter applied to a clean steel substrate. After drying for about 24 hours, the coating exhibits a hardness value of about 6H.

EXAMPLE 9

A binder composition is prepared by slowly adding with agitation 76 parts of deionized water to a reactor containing 268 parts of methyl tri-(2-methoxy-ethoxy) silane, 53 parts of ethylene glycol monoethyl ether, 13.4 parts of benzoylacetone and 0.05 part of 37 percent hydrochloric acid and thereafter continuing to agitate the reaction mixture for about 2 hours at a temperature up to about 75° C.

The binder composition thus prepared is mixed with zinc dust (2 to 6 microns) in a ratio of 30 parts binder to 70 parts zinc dust and thereafter applied to a cleaned steel substrate. After drying at a temperature of about 100° C. for about 2 hours, a satisfactory coating is obtained.

When the above examples are repeated using other hydrocarbonoxy silanes, in the presence of other solvents, diketones and particulate solids, coating compositions are obtained which have properties substantially the same as those of the specific examples.

Although specific examples are mentioned and have been herein described, it is not intended to limit the invention solely thereto but to include all the variations and modifications falling within the spirit and scope of the appended claims.

The invention claimed is:

1. A binder composition having an $SiO_2$ content of from 5 to about 40 percent comprising a diketone having the general formula $$R''''-\overset{O}{\underset{\|}{C}}-Z-\overset{O}{\underset{\|}{C}}-R''''$$

wherein $R''''$ is selected from the group consisting of monovalent hydrocarbon radicals, halohydrocarbon and oxyhydrocarbon radicals having from 1 to 12 carbon atoms and Z is a divalent hydrocarbon radical having from 1 to 4 carbon atoms and a condensate of a silane selected from the group consisting of $$RSi(OR')_3 \text{ and } RSi(OR''OR''')_3$$

in which R and R' represent hydrocarbon radicals having up to 10 carbon atoms, R'' is a divalent hydrocarbon radical having from 2 to 6 carbon atoms and R''' is selected from the group consisting of hydrocarbon radicals having up to 10 carbon atoms and hydrogen, said condensate is obtained from the reaction of the silane with from 0.8 mole to about 4.5 moles of water per hydrocarbonoxy group connected to the silicon atom in the presence of sufficient acid to provide a pH of from 1.0 to 5.5, said diketone is present in an amount of from 0.5 to about 10 percent by weight based on the weight of the silane.

2. The composition of claim 1 wherein the silane is $$RSi(OR')_3$$

in which R and R' represent hydrocarbon radicals having up to 10 carbon atoms.

3. The composition of claim 1 wherein the silane is $$RSi(OR''OR''')_3$$

in which R and R''' are hydrocarbon radicals having from 1 to 10 carbon atoms and R'' is a divalent hydrocarbon radical having from 2 to 6 carbon atoms.

4. The composition of claim 1 wherein R''' is hydrogen.

5. The composition of claim 1 wherein an organic solvent is incorporated therein.

6. The composition of claim 5 wherein the solvent is an ether selected from the class consisting of monoalkylene glycol monoalkyl ethers, monoalkylene glycol dialkyl ethers, dialkylene glycol monoalkyl ethers and dialkylene glycol dialkyl ethers.

7. A method for preparing the binder composition of claim 1 which comprises reacting a silane selected from the group consisting of $$RSi(OR')_3 \text{ and } RSi(OR''OR''')_3$$

in which R and R' represent hydrocarbon radicals having up to 10 carbon atoms, R'' is a divalent hydrocarbon radical having from 2 to 6 carbon atoms and R''' is selected from the group consisting of hydrocarbon radicals having up to 10 carbon atoms and hydrogen, with from 0.8 mole to about 4.5 moles of water per hydrocarbonoxy group connected to the silicon atom in the presence of sufficient acid to provide a pH of from 1.0 to 5.5 to form a condensate and thereafter adding from 0.5 to about 10 percent by weight based on the weight of the silane of a diketone having the general formula $$R''''-\overset{O}{\underset{\|}{C}}-Z-\overset{O}{\underset{\|}{C}}-R''''$$

wherein $R''''$ is selected from the group consisting of monovalent hydrocarbon radicals, halohydrocarbon and oxyhydrocarbon radicals having from 1 to 12 carbon atoms and Z is a divalent hydrocarbon radical having from 1 to 4 carbon atoms to the condensate.

8. A coating composition comprising zinc and a binder having an $SiO_2$ content of from 5 to about 40 percent, said binder containing a diketone having the formula $$R''''-\overset{O}{\underset{\|}{C}}-Z-\overset{O}{\underset{\|}{C}}-R''''$$

wherein $R''''$ is selected from the group consisting of monovalent hydrocarbon radicals, halohydrocarbon and oxyhydrocarbon radicals having from 1 to 12 carbon atoms and Z is a divalent hydrocarbon radical having from 1 to 4 carbon atoms and a condensate which is obtained from the reaction of a silane selected from the group consisting of $$RSi(OR')_3 \text{ and } RSi(OR''OR''')_3$$

in which R and R' represent hydrocarbon radicals having up to 10 carbon atoms, R'' is a divalent hydrocarbon radical having from 2 to 6 carbon atoms and R''' is selected from the group consisting of hydrocarbon radicals having up to 10 carbon atoms and hydrogen, with from 0.8 mole to about 4.5 moles of water per hydrocarbonoxy group connected to the silicon atom in the presence of sufficient acid to provide a pH of from about 1.0 to about 5.5, said diketone is present in an amount of from 0.5 to about 10 percent by weight based on the weight of the silane, said binder to zinc being in a ratio of from 50:50 to 10:90 on a weight basis.

9. The coating composition of claim 8 wherein the coating composition contains in addition to zinc, a filler material, the total ratio of binder to zinc and filler being from 70:30 to 10:90 on a weight basis.

10. The coating composition of claim 9 wherein the filler material is an alkaline earth metal silicate comprising calcium and/or magnesium.

11. The coating composition of claim 9 wherein the filler material is a fibrous mineral substance.

12. A binder composition having an $SiO_2$ content of from 5 to about 40 percent comprising a condensate of a silane selected from the group consisting of $$RSi(OR')_3 \text{ and } RSi(OR''OR''')_3$$

in which R and R' represent hydrocarbon radicals having up to 10 carbon atoms, R'' is a divalent hydrocarbon radical having from 2 to 6 carbon atoms and R''' is selected from the group consisting of hydrocarbon radicals having up to 10 carbon atoms and hydrogen, said condensate is obtained from the reaction of the silane with from 0.8 mole to about 4.5 moles of water per hydrocarbonoxy group connected to the silicon atom in the presence of a sufficient acid to provide a pH of from 1.0 to 5.5 and from 0.5 to about 10 percent by weight based on the weight of the silane of a diketone having the general formula $$R''''-\overset{O}{\underset{\|}{C}}-Z-\overset{O}{\underset{\|}{C}}-R''''$$

wherein $R''''$ is selected from the group consisting of monovalent hydrocarbon radicals, halohydrocarbon and oxyhydrocarbon radicals having from 1 to 12 carbon atoms and Z is a divalent hydrocarbon radical having from 1 to 4 carbon atoms.

13. A method for preparing the binder composition of claim 12 which comprises reacting a silane selected from the group consisting of $$RSi(OR')_3 \text{ and } RSi(OR''OR''')_3$$

in which R and R' represent hydrocarbon radicals having up to 10 carbon atoms, R'' is a divalent hydrocarbon radical having from 2 to 6 carbon atoms and R''' is selected from the group consisting of hydrocarbon radicals having up to 10 carbon atoms and hydrogen, with from 0.8 mole to about 4.5 moles of water per hydrocarbonoxy group connected to the silicon atom in the presence of sufficient acid to provide a pH of from 1.0 to 5.5 and from 0.5 to about 10 percent by weight based on the weight of the silane of a diketone having the general formula

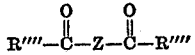

wherein R'''' is selected from the group consisting of monovalent hydrocarbon radicals, halohydrocarbon and oxyhydrocarbon radicals having from 1 to 12 carbon atoms and Z is a divalent hydrocarbon radical having from 1 to 4 carbon atoms.

14. A coating composition comprising zinc and a binder having an $SiO_2$ content of from 5 to about 40 percent, said binder composition containing a condensate which is obtained from the reaction of a silane selected from the group consisting of

in which R and R' represent hydrocarbon radicals having up to 10 carbon atoms, R'' is a divalent hydrocarbon radical having from 2 to 6 carbon atoms and R''' is selected from the group consisting of hydrocarbon radicals having up to 10 carbon atoms and hydrogen, with from 0.8 mole to about 4.5 moles of water per hydrocarbonoxy group connected to the silicon atom in the presence of sufficient acid to provide a pH of from about 1.0 to about 5.5 and from 0.5 to about 10 percent by weight based on the weight of the silane of a diketone having the general formula

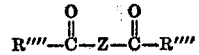

wherein R'''' is selected from the group consisting of monovalent hydrocarbon radicals, halohydrocarbon and oxyhydrocarbon radicals having from 1 to 12 carbon atoms and Z is a divalent hydrocarbon radical having from 1 to 4 carbon atoms, said binder to zinc being in a ratio of from 50:50 to 10:90 on a weight basis.

References Cited
UNITED STATES PATENTS

| | | | |
|---|---|---|---|
| 3,367,910 | 2/1968 | Newing | 260—46.5 R |
| 3,457,221 | 7/1969 | Stengle | 260—46.5 R |
| 2,768,993 | 10/1956 | Drummond | 260—37 SB |

LEWIS T. JACOBS, Primary Examiner

U.S. Cl. X.R.

260—46.5 R